(12) United States Patent
Nihlwing

(10) Patent No.: US 8,970,594 B2
(45) Date of Patent: Mar. 3, 2015

(54) PLANT PROCESS DISPLAY

(75) Inventor: Christer Nihlwing, Halden (NO)

(73) Assignee: Institutt for Energiteknikk, Kjeller (NO)

( * ) Notice: Subject to any disclaimer, the term of this patent is extended or adjusted under 35 U.S.C. 154(b) by 650 days.

(21) Appl. No.: 13/122,704

(22) PCT Filed: Oct. 5, 2009

(86) PCT No.: PCT/NO2009/000353
§ 371 (c)(1),
(2), (4) Date: Aug. 1, 2011

(87) PCT Pub. No.: WO2010/041960
PCT Pub. Date: Apr. 15, 2010

(65) Prior Publication Data
US 2011/0292083 A1 Dec. 1, 2011

Related U.S. Application Data

(60) Provisional application No. 61/103,030, filed on Oct. 6, 2008.

(51) Int. Cl.
*G06T 11/20* (2006.01)
*G05B 23/02* (2006.01)
*G06F 3/0484* (2013.01)
*G06Q 10/06* (2012.01)

(52) U.S. Cl.
CPC ........ *G05B 23/0272* (2013.01); *G06F 3/04847* (2013.01); *G06Q 10/06* (2013.01); *G06F 2203/04806* (2013.01)
USPC ........................................ 345/440

(58) Field of Classification Search
USPC .............................................. 345/440, 440.1
See application file for complete search history.

(56) References Cited

U.S. PATENT DOCUMENTS

| 4,803,039 | A | | 2/1989 | Impink, Jr. et al. |
| 5,493,515 | A | | 2/1996 | Batchelder et al. |
| 5,579,463 | A | * | 11/1996 | Takano et al. ................. 345/440 |
| 5,777,896 | A | | 7/1998 | Arita et al. |
| 5,859,885 | A | | 1/1999 | Rusnica et al. |

(Continued)

FOREIGN PATENT DOCUMENTS

WO    0049475 A2    8/2000

OTHER PUBLICATIONS

International Search Report dated Dec. 21, 2009 for International Application No. PCT/NO2009/000353.

(Continued)

*Primary Examiner* — M Good Johnson
(74) *Attorney, Agent, or Firm* — Christopher & Weisberg, P.A.

(57) ABSTRACT

A system, method and computer program screen system comprising process monitoring displays showing complex information in condensed form; the process monitoring displays comprises part-plant displays showing an overview covering selected areas of a process plant, said part-plant displays comprising diagrams with graphs over measured parameters where the diagram's scale may be changed in order to let an operator more easily observe trends in values of the measured parameters. Combined with the diagrams are one or more visual representations showing whether one or more areas of the graph has been scaled, the said visual representation of scaling indicates the range and place of the displayed ordinates relative to a larger, preset range.

15 Claims, 2 Drawing Sheets

(56) References Cited

U.S. PATENT DOCUMENTS

| | | | |
|---|---|---|---|
| 5,939,877 A * | 8/1999 | Alexander | 324/121 R |
| 6,335,722 B1 * | 1/2002 | Tani et al. | 345/173 |
| 6,609,085 B1 * | 8/2003 | Uemura et al. | 702/189 |
| 6,892,107 B2 * | 5/2005 | Baba et al. | 700/108 |
| 6,917,889 B2 * | 7/2005 | Ward et al. | 702/67 |
| 6,965,376 B2 * | 11/2005 | Tani et al. | 345/173 |
| 7,233,333 B2 * | 6/2007 | Lomask | 345/440 |
| 2002/0054144 A1 * | 5/2002 | Morris-Yates | 345/809 |
| 2004/0021695 A1 * | 2/2004 | Sauermann et al. | 345/786 |
| 2005/0228608 A1 | 10/2005 | Wells | |
| 2007/0273694 A1 | 11/2007 | Dobyns et al. | |
| 2007/0285426 A1 * | 12/2007 | Matina | 345/440 |
| 2008/0144905 A1 * | 6/2008 | Tallman | 382/131 |

OTHER PUBLICATIONS

European Search Report dated Jun. 14, 2012 for European Patent Application No. EP09819438. Consisting of two pages.

ProcSee Graphical User Interface Management System, (Reference Manual), 588-pages, Published by Institute for Energy Technology, OECD Halden Reactor Project, Jun. 2013.

* cited by examiner ated Oct. 5,
PLANT PROCESS DISPLAY

CROSS-REFERENCE TO RELATED APPLICATION

This application is a 35 U.S.C §371 of International Patent Application Serial No. PCT/NO2009/000353, filed Oct. 5, 2009, entitled IMPROVED PLANT PROCESS DISPLAY, which claims priority to U.S. Provisional Patent Ser. No. 61/103,030, filed Oct. 6, 2008, the entirety of which is incorporated herein by reference.

STATEMENT REGARDING FEDERALLY SPONSORED RESEARCH OR DEVELOPMENT n/a

FIELD OF THE INVENTION

The present invention relates to user interactive computer supported display technology, and particularly to such user interactive systems, apparatus, methods and computer programs that condense complex information in the process monitoring displays.

BACKGROUND OF THE INVENTION

Modernization of control rooms of power plants, process industries or ships or the like often results in exchanging a panel and desk based control room to a more or less screen based control room and problems with obtaining process overview is often a result. When operating in an old type of control room, it is normally possible to see all operating objects on walls and panels and thus possible to maintain a process overview at several levels of the whole plant through parts of the plant down to individual objects. When operating on a single object it is easy to take a step back and obtain a process overview of the specific process area. In a screen based control room this advantage may be lost due to the design of the operating process displays covering just a small area of the plant, and at the large overview display showing status of the whole plant the operator easily lose orientation.

U.S. Pat. No. 5,777,896 describes a plant monitoring system based on CRT screens of different sizes. Plant information required for an operator to manipulate the plant is displayed on a first screen and plant data influenced by the manipulation is displayed on a second larger screen placed behind a manipulating and monitoring panel. The content of both displays are thus complementing each other in order to facilitate understanding of the information.

U.S. Pat. No. 5,859,885 describes a hierarchy of different layers for designing screens. Trends showing a ten minutes history of a parameter are shown on a display as a vertical meter showing the relative location of the parameter at the current time against the meter scale and a current digital value of the parameter.

ProcSee is a versatile software tool for developing and displaying dynamic graphical user interfaces, particularly aimed at process monitoring and control. The ProcSee Graphical User Interface Management System-Reference Manual is available at online.

These systems can display trends from the readings of various sensors as part of larger process and plant displays, and ProcSee is an example of software that can be used for implementing such systems. However, when the trends are displayed, the operator cannot easily understand the magnitude of the trend change, without reading the values indicated on or near an axis shown on the display.

SUMMARY OF THE INVENTION

The present invention advantageously provides a method and system for control room screens which can be designed having a hierarchy of different layers from the detailed object process display all way up to the overview display.

In order to assist operators in obtaining early process warnings with less cognitive effort part-plant overview displays are introduced as a complement to the plant overview display. The part-plant overview displays represent a layer between the overview display and the process operating displays from where the operators mostly operate the plant.

The part-plant displays should cover select areas of the plant which are large enough to cover the processes of the selected parts and yet small enough to include necessary data for the operator to obtain a proper process overview of the plant area.

The part-plant displays are primarily used for surveillance of the processes and have the function of alerting the operator when deviations occur in the selected area of the plant. The operator may use the part-plant overview display for navigation purposes in order to select detailed process displays.

The alerts are presented as visual changes that are easy to detect on the displays. Instead of showing numbers indicating performance of operational units, the units are represented by for example geometric figures that are easily recognized by the operator and easily compared with each other or with other patterns shown on the display. Also sound signals can be added as representing alerts.

Another feature simplifying monitoring of the plant concerns visual representations on the side of diagrams showing whether an area of the graph has been scaled up (or down) in order to let the operator more easily detect small changes. The visualization will also readily show if the scaling has been done with a small or large step.

Trends of measured variables can be shown with various visual representations and graphs, such as a curve, showing how the variable has developing, usually during a specific time span. One axis may represent time, another represents the measured variable in e.g. effect or temperature.

There are many layouts for such representations, using for example curves, bars, columns, dots or pie charts. The representation can be two, three or multi-dimensional. Colours, symbols, figures and letters can be used to add information.

The present invention is an auto scaled trend or auto scaled mini trend, where the representation is scaled automatically, to allow the trend to be best presented in the allocated space on the display. The scale of the displayed trend is shown together with the trend, so that a large change, is indicated with a large symbol, such as a long bar along the ordinate axis, as the ordinates varies over a large range. A small change is indicated with a small symbol, such as a short bar. The marker is placed to indicate where in the total measurement range the changes take place, i.e. the view of the axis is shown relative to all possible values on the axis. Thus the operator can immediately, without looking at the values, see if the trend change is relevant or just a minor change, knowing where in the measurement range the trend is and still have a maximal resolution in the allocated space for this diagram.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Features of the present invention are described in more detail using a boiling water reactor (BWR) as example. This does not exclude that the invention can be used for other processes requiring a process monitoring and control display system in order to deal with large quantities of information, such as systems used for the operations of oil platforms, refineries, foundries, large ships, factories and mills.

In this example values such as temperature and power are measured versus time. For the control panel of a BWR it makes sense to display these values in diagrams using two dimensions, with ordinary x- and y-axis. For other processes more dimensions and other types of diagrams can be visualized using the present invention.

Various sensors provide information about the process. The software in the computer processes the information and converts it to graphical symbols presented in layers, using the steps of i) gathering information from the sensors of the system, ii) choosing the symbols, graphical and numerical, to be displayed in accordance with the preferences and layers stored by the operator or preconfigured for the system or the display iii) updating the symbols with intervals as decided by the operator or predefined in the configuration of the system. iv) allowing the operator to change views and layers and to select various parts of the plant to displayed running steps i)-iii) for this selection. The graphical and numerical symbols may come with a sound signal characteristic for the measured values.

Figure 1:
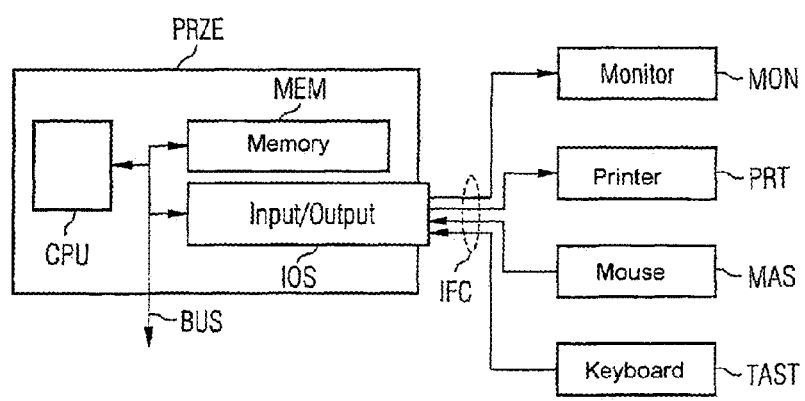
FIG. 1 Computer with processor unit

FIG. 1 shows a computer's processor unit PRZE. The processor unit PRZE incorporates a processor CPU, a memory MEM, and an input/output interface IOS, which is used in various ways via an interface IFC: an output is shown visually on one or more monitors MON via a graphic interface, and/or is output on a printer. Inputs are made via a mouse MAS or a keyboard TAST. These can be interchanged with or combined with other input means, such as touch screens. The processor unit PRZE also provides a data bus BUS, which establishes the link between a memory, MEM, the processor CPU and the input/output interface IOS. Further, additional components can be connected to the data bus, for example additional memory, data storage (hard disk) or scanners. The sensors of the system are connected either directly to the IOS, or via a network interface that is connected to the IOS or the BUS. The network interface could be proprietary or using e.g. TCP/IP communication.

An operator will have a mental model of the plant that depends on experience, knowledge and training. When it is observed that deviations from the model is occurring, the operator can check that plant area and the right process display in order to verify the malfunction.

The computer will process the date using the processor unit PRZE using the steps of:

a) input data from one or more sensors through an interface IOS to the processor unit PRZE;
give each measured value a time stamp and create ordered pairs of the data;

b) process the data, calculate ordinate values to be displayed on the monitor MON for a known fixed span of time where the ordinate axis is scaled automatically in order to allow the graph to be presented in the allocated space of the diagram on the display;

c) calculate what areas of the graph has been scaled using a range of ordinates as basis and display on the monitor MON one or more visual representations of that scaling indicating the range and place of the displayed ordinates;

The range could be preset and would normally be the total possible range of measurements.

The condenser is important for a BWR plant and shall condense the steam from the low pressure turbine, regulate the reactor pressure in case of a bypass operation, extract non condensable gases to the off gas system and provide the condensate system with water. So, the condenser can be dived into two parts; a gas phase and water phase. The pressure in the gas phase is almost vacuum and the ejectors are keeping it low by extracting non condensable gases. The steam is condensed by six large sea water pumps pumping 50 cubic meter sea water per second through the condenser tubes. The water phase is a large cooling reservoir even after the gas is condensed. If a transient in the plant makes the gas phase unserviceable, the water phase can be used to keep the water level constant in the reactor tank when there is a lot of rest heat.

As an example, is described one type of problem that may occur in the condenser area. If a drain valve that normally shall be closed open and drain water to the condenser that normally should go to the feed water tank, it will lead to decreasing plant efficiency and if the plant is running in power regulation mode, the main core cooling pumps increase the reactor power to keep the generator power constant. In the condenser this will lead to increasing pressure and the turbine operator is normally fast to detect that. When the pressure in the condenser increases it is easily interpreted as air starting to leak in. The off gas flow is also increasing and the reactor power.

With only traditional process displays to rely on, the turbine operator spend time on looking at the ejectors and sending out people to listen after air leaking in because he/she detect an increasing pressure in the condenser. With a good plant-part overview it is simple to train the turbine operator to identify different patterns on the display and to thereby get the right understanding of the transient without reading and comparing a lot of numbers on scales.

Figure 2A:
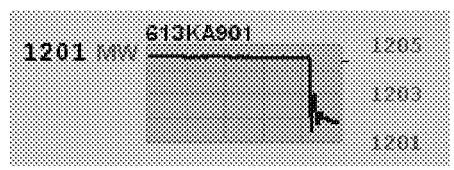
FIGS. 2a and 2b Auto scaled mini trends
Figure 2B:
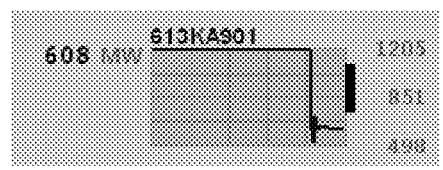

FIG. 2 shows one embodiment of the present invention that will be displayed in an allocated space on a display on a monitor MON. The output of the plant is shown in MW, i.e. mega watts. FIG. 2a shows the output to be 1201 MW measured by a sensor named 613KA901. The abscissa, x-axis, shows time, and spans a period of ten minutes. The representation is scaled automatically, to allow the trend to be best presented in the allocated space in the display, thus as the variations are small, the ordinates are between 1201 and 1205 MW. In the upper right corner is a small short black bar, indicating that 1201-1205 is a very small part of the total measurement range, and in the upper part of that range. In FIG. 2b there is a large change from 1205 MW to 498 MW and then to the present 608 MW as indicated to the left. This change is in the middle of the measurement range, and is a large change. The auto scaled mini trend bar is thus large and placed in the middle of the ordinate axis.

Figure 3:
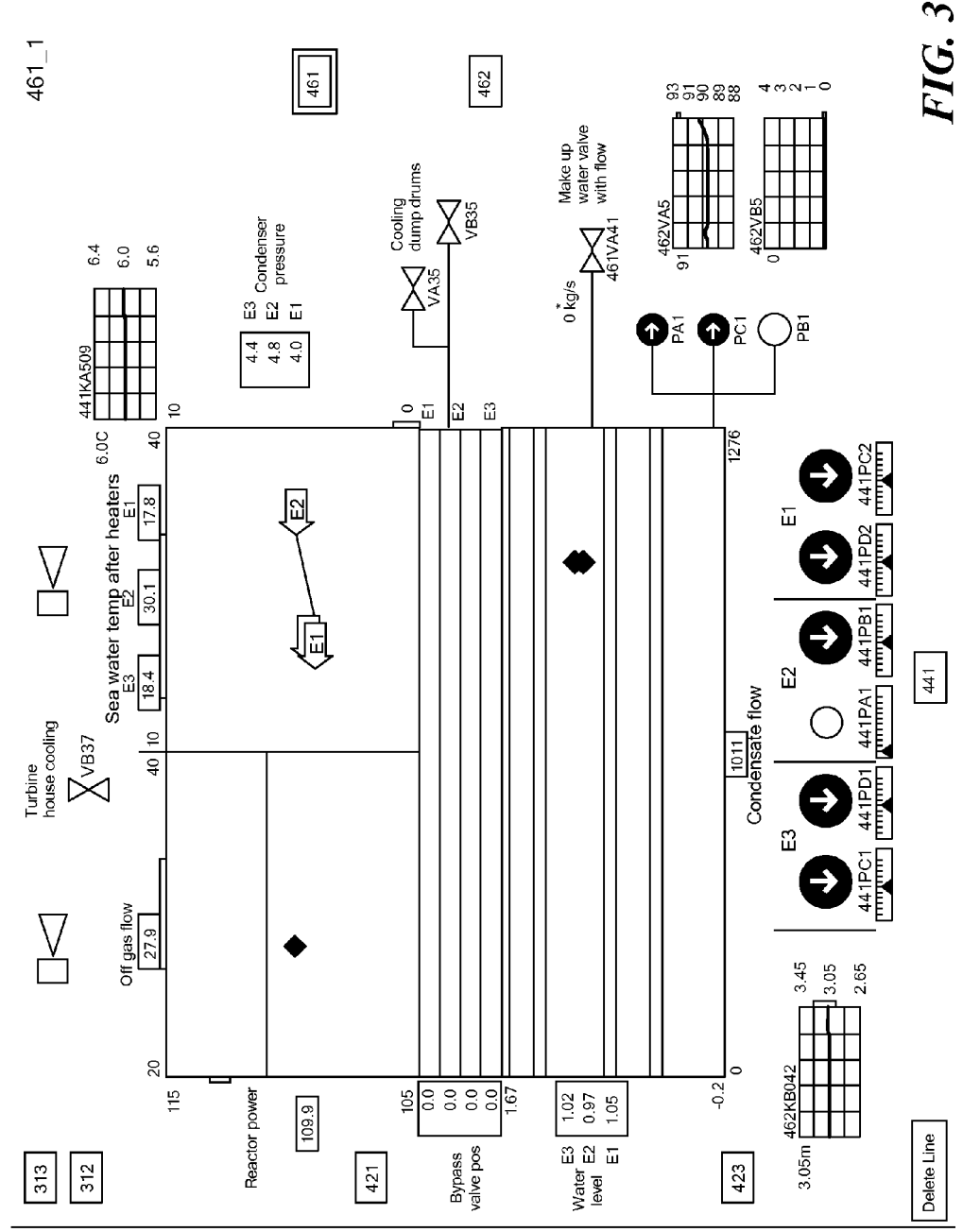
FIG. 3 Plant part overview with auto scaled trends and auto scaled mini trends

The complete plant-part display, as shown on the monitor MON, for the condenser area can be seen in FIG. 3. In the upper left light grey area is an X-Y diagram showing reactor power on the Y axis with its absolute value to the left and off gas flow on the X axis with its absolute value on the top. The area is auto scaled to improve detection of small changes. The part of the scale that is shown can be seen as a black bar graph on the left side for the reactor power and on the top for the off gas flow. The range for the reactor power is 0 to 140 percent and the area now observed is 105 to 115 percent. Thus these small black bars, chosen as visual indication of auto scaling in this embodiment, trends make it possible for the operator to easily detect if a movement of measurement is a big step or just a small change, and also to know that this trend or area is auto scaled.

When it comes to the off gas flow the measurement range goes from 0 to 60 cubic meter per hour and the area observed is 20 to forty cubic meter per hour.

On the right side is the vacuum showed on the Y axis together with the sea water temperature after the tubes on the X axis. They are also auto scaled in the same way. Here it is three measurement one from each condenser chamber. Normally the values are on the top of each adder but in some transients they can separate. For example if a main sea water cooling pump is stopping the chamber cannot condensate the same amount of water and the pressure in that chamber will increase and also the sea water temperature after the chamber. The reactor power will also slightly increase if the plant is in power operating mode due to the decreasing plant efficiency. Having plant-part displays the operator will access all that information on one display instead of having to look at several process displays. It is also easy to train and remember different patterns having different consequences for operating the plant.

Under the two rectangles the bypass valves are shown with the position and the absolute value to the left. Even the bypass blocking valves are shown integrated into the same area. If for example a bypass blocking valve close due to a malfunction after a turbine trip, it shall be easy to fast detect that. And since the bypass regulating valve will still regulate but no steam will come through, it can be difficult to detect if there are just two valve symbols after each other as in a conventional process display.

In the area under the bypass valves, the water phase and water level are on the Y axis and condensate flow on the X-axis. The water level is regulated by make up water when needed. Here it is easy to detect if something happens on the way to the feed water tank that affects the water flow. There are for example two, 100 percent each, level regulating valves for the feed water tank and if the one in operation is closing and the one in standby is not opening fast action is needed to avoid high water level in the condenser. For this area a fast movement to the left will attract the operator instead of just position number behind the valve in an ordinary process display. These valves positions are also shown in two auto scaled mini trends to the right. The area around the condenser visualization includes two more auto scaled mini trends, the one up to the right is sea water temperature and the one down to the left is the water level in the feed water tank. The top symbol of the two ejectors, the one to the right is in operation and the other is in standby position. The symbols include integrated information as to correct steam operating pressure, correct valve positions, showing if the objects are operating properly. If not, an indication shows in form of an alarm color. The valve for low pressure turbine cooling is also indicating if it works or not and also if it has order to open. The same goes for the two bypass spray vales to the right.

Short cut buttons to different relevant process displays are placed in relevant area. These short cut buttons do not replace the plant part overview display; instead the process display comes up on another screen. The condenser plant part overview contains information from seven different process displays.

In this embodiment, the following rules are used for the calculation in PRZE of the visual representation of the auto scaled trends that is displayed on the monitor MON:
i. The diagram's upper limit shall always be equal to or greater than the maximum value of the trended variables' visual representation within the viewable time span.
ii. The diagram's lower limit shall always be equal to or less than the minimum value of the trended variables within the viewable time span.
iii. The diagram's upper limit shall be reduced automatically when a curve's maximum value disappears from the diagram due to its timestamp.
iv. The diagram's lower limit shall be increased automatically when a curve's minimum value disappears from the diagram due to its timestamp.
v. The limits shall be modified automatically to ensure that the difference between the upper and lower limit is always equal to or greater than a user-defined percentage of the total value range.
vi. The limits shall be modified automatically to ensure that their values are always multiples of user defined numbers, e.g. multiples of 100.

The System, Method and Software

The system of the present invention consists of one or more computers implementing the system as described in independent claim 1 and the there to belonging dependent claims.

The method of the present invention consists of the steps as described in independent claim 5 and the there to belonging dependent claims.

The software in the various units in the system of the present invention implements the steps as described in independent claim 8 and 9.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A computer supported display screen system comprising:
   a display in communication with a computer processor, the display operable to display:
   process monitoring information in a condensed form;
   one or more part-plant displays showing selected areas of a process plant, each of the one or more part-plant displays including one or more diagrams with one or more graphs having ordinates and a scale, the ordinates representing measured parameters, and wherein the graphs' scale is adjustable; and
   one or more visual representations associated with each of the one or more graphs, each visual representation indicating whether the associated graph has been scaled, both the size and position of each visual representation of scaling together indicating a range and place of the displayed ordinates in the associated graph relative to a total range of measured parameters.

2. The computer supported display screen system in accordance with claim 1, wherein the scale and view of the ordinates is changed automatically allowing the graph to be presented in a predefined allocated space of the diagram on the display.

3. The computer supported display screen system in accordance with claim 1, wherein at least one of the diagrams defines an upper limit, the upper limit being equal to or greater than a maximum value of the associated visual representation within a viewable time span.

4. The computer supported display screen system in accordance with claim 3, wherein the upper limit is reduced automatically when the graph's maximum value disappears from the diagram based on a timestamp.

5. The computer supported display screen system in accordance with claim 1, wherein at least one of the diagrams defines a lower limit, the lower limit being equal to or less than a minimum value of the measured parameters within a viewable time span.

6. The computer supported display screen system in accordance with claim 5, wherein the lower limit is increased automatically when a graph's minimum value disappears from the diagram based on a timestamp.

7. The computer supported display screen system in accordance with claim 1, wherein at least one of the diagrams defines an upper and lower limit, the upper and lower limits being automatically modified such that a difference between the upper and lower limit is equal to or greater than a user-defined percentage of a total value range.

8. The computer supported display screen system in accordance with claim 7, wherein the upper and lower limit said limits are automatically modified such that their values are multiples of user defined numbers.

9. A method for calculating and displaying diagrams, comprising:
   displaying on a monitor at least one diagram including at least one graph having measured parameters, the graph including an adjustable scale and a view, the scale and view being adjustable within a predefined allocated space on the monitor;
   inputting data of measured values from one or more sensors through an interface to a processor unit;
   assigning each measured value a time stamp;
   creating ordered pairs of the inputted data;
   processing the inputted data;
   calculating ordinate values to be displayed on the monitor for a predefined fixed span of time, wherein an ordinate axis is scaled automatically such that the graph is presented in an allocated space on the display;
   determining which areas of the graph have been scaled based on a range of ordinates;
   displaying on the monitor one or more visual representations of the automatically scaled ordinate axis, both a size and a position of each visual representation together indicating range and place of the displayed ordinates in relation to an unscaled graph including a total range of measured parameters.

10. The method for calculating and displaying diagrams in accordance with claim 9, wherein at least one of the diagrams defines an upper limit, the upper limit being equal to or greater than a maximum value of the associated visual representation within a viewable time span.

11. The method for calculating and displaying diagrams in accordance with claim 10, wherein the upper limit is reduced automatically when the graph's maximum value disappears from the diagram based on a timestamp.

12. The method for calculating and displaying diagrams in accordance with claim 9, wherein at least one of the diagrams defines a lower limit, the lower limit being equal to or less than a minimum value of the measured parameters within a viewable time span.

13. The method for calculating and displaying diagrams in accordance with claim 12, wherein the lower limit is increased automatically when a graph's minimum value disappears from the diagram based on a timestamp.

14. The method for calculating and displaying diagrams in accordance with claim 9, wherein at least one of the diagrams defines an upper and lower limit, the upper and lower limits being automatically modified such that a difference between the upper and lower limit is equal to or greater than a user-defined percentage of a total value range.

15. The method for calculating and displaying diagrams in accordance with claim 14, wherein the upper and lower limit said limits are automatically modified such that their values are multiples of user defined numbers.

\* \* \* \* \*